United States Patent [19]  [11] Patent Number: 4,958,526
Haggstrom  [45] Date of Patent: Sep. 25, 1990

[54] FORCE MEASURING DEVICE WITH ZERO ADJUSTMENT

[75] Inventor: Rolf P. Haggstrom, East Walpole, Mass.

[73] Assignee: Flintab AB, Väasterås, Sweden

[21] Appl. No.: 419,391

[22] Filed: Oct. 10, 1989

[51] Int. Cl.$^5$ .................. G01L 1/22; G01L 25/00
[52] U.S. Cl. .................. 73/862.67; 73/862.63; 73/766; 73/1 B
[58] Field of Search ............. 73/862.63, 862.67, 765, 73/766, 1 B

[56] References Cited

U.S. PATENT DOCUMENTS 3,576,128  4/1971  Lockery .
3,968,676  7/1976  Ormond .
4,380,175  4/1983  Griffen .
4,556,115  12/1985  Lockery et al. ............ 73/862.67

Primary Examiner—Charles A. Ruehl
Attorney, Agent, or Firm—Staas & Halsey

[57] ABSTRACT

A strain gage load cell is adjusted to zero output signal at no load or a fixed tare load on the load cell independent of the load cell temperature by shunting a pair of opposing arms of the strain gage bridge by equal resistors, and connecting a pair of equal resistors between opposite terminals of the power supply for the strain gage bridge and opposite corners of the output terminals of the strain gage bridge. The zero adjustment according to the invention is especially useful with load cell arrangements where individual strain gage elements must have equalized sensitivities.

3 Claims, 2 Drawing Sheets

FORCE MEASURING DEVICE WITH ZERO ADJUSTMENT

BACKGROUND OF THE INVENTION

The present invention relates to strain gage load cells for precision measurement of weights and forces, especially load cells of the Planar Gaged Plate design, and specifically to improvements in the zero adjustments for such load cells.

The most common method for zero adjustment of strain gage bridges uses resistors in series with individual bridge arms. This requires soldering resistors into the strain gage bridge after initial temperature tests. This is a cumbersome process.

It is also known to adjust a strain gage bridge to give zero output at zero load, independent of load cell temperature, by means of two resistors, one shunting a bridge arm, and the other connecting a corner of the strain gage bridge to one terminal of the power supply for the strain gage bridge. These resistors can be connected without opening arms of the strain gage bridge. Consequently, this is a preferred method for zero adjustment.

This preferred method can not be used, however, for zero adjustment of load cells where the sensitivity of individual strain gages must remain constant because the sensitivity equalization will be affected by the zero adjustments. Examples of such load cells and methods for equalizing the sensitivities of individual strain gage elements are disclosed in U.S. Pat. Nos. 3,576,128, 3,968,676 and 4,380,175, and in a copending, commonly-assigned application entitled "Force Measuring Device with Sensitivity Equalization" by Harry E. Lockery.

SUMMARY OF THE INVENTION

The present invention is an improvement of the known method for zero adjustment using resistors outside the bridge arms, which can be used even in load cell arrangements where the sensitivity of individual strain gage elements must maintain equal sensitivity.

In accordance with this invention, a load cell apparatus, or arrangement with a strain gage bridge having four individual strain gage means and a pair of temperature compensation resistors connected between each end of a first diagonal of the strain gage bridge, a power supply for the bridge, and a measuring circuit being connected across a second diagonal in said strain gage bridge, comprises a first pair of substantially equal resistors connected across one pair of opposing arms of the strain gage bridge so that the signal at zero load on the load cell arrangement is rendered independent of temperature, and a second pair of substantially equal resistors connected between the two terminals of the power supply to the strain gage bridge and the two ends of the second diagonal of the strain gage bridge so the signal at zero load on the load cell arrangement is balanced to be zero.

DETAILED DESCRIPTION OF THE PREFERRED EMBODIMENT

Figure 1A:
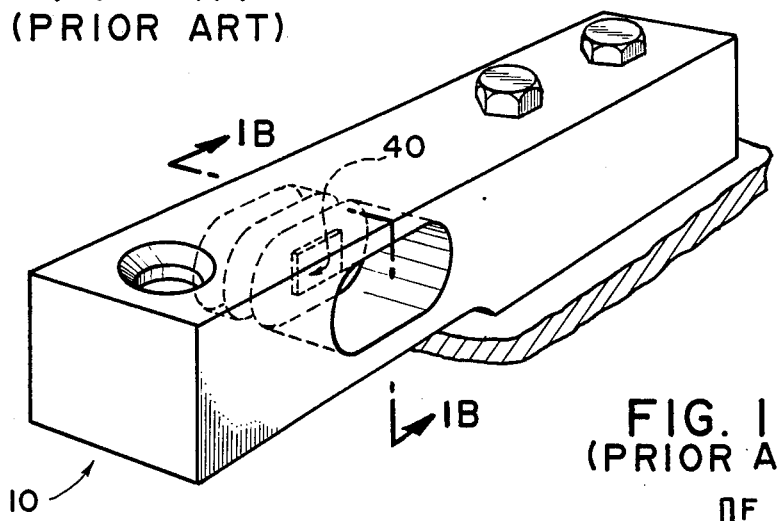
FIGS. 1A through 1C are respectively a perspective view, a cross-sectional view taken along line 1B—1B in FIG. 1A, and a partial side view of a prior art shear beam type load cell with a strain gage bridge.
Figure 1B:
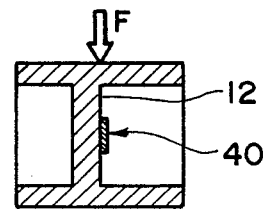
Figure 1C:
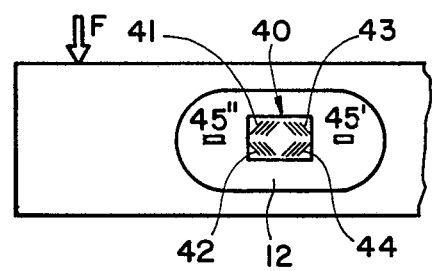

FIGS. 1A, 1B and 1C show a shear beam load cell 10 in which a strain gage assembly 40 is mounted on a recessed surface 12 subject to shear stress. The strain gage assembly 40 contains four individual strain gage elements 41, 42, 43 and 44 on a common base that is bonded to the surface 12. A pair of temperature sensitive resistors 45', 45" are also bonded to the surface 12. The individual strain gage elements 41, 42, 43, 44 are arranged at a 45 degree angle to an axis of the load cell 10, as illustrated, so that a first pair 41, 44 are subject to tensile strain and a second pair 42, 43 are subject to compressive strain when a force F acts on the load cell.

Figure 2:
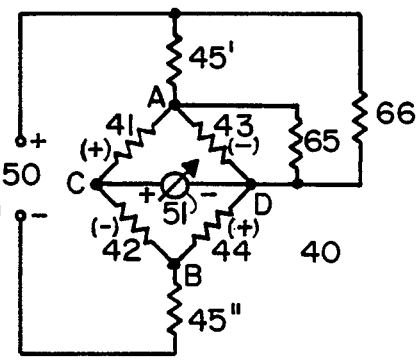
FIG. 2 is a schematic diagram of a strain gage bridge with previously known zero adjustment by means of shunt resistors.

FIG. 2 shows how the four strain gages 41, 42, 43, 44, which are made of material with very low temperature coefficient of resistance, are connected together in a bridge arrangement 40. A first bridge diagonal (A-B) is connected to a source of power 50 in series with the temperature dependent resistors 45', 45", and a measuring device 51 is connected to a second bridge diagonal (C-D). The two strain gages 41, 44 subject to tensile strain are connected in opposing bridge arms, as are the two gages 42, 43 subject to compressive strain. Accordingly, the second bridge diagonal (C-D) will provide a signal, increasing linearly with the force F acting on the load cell, to a measuring device or circuit 51.

The known purpose of the temperature dependent resistors 45', 45" is to compensate for the temperature variation of the modulus of elasticity of the sensing element of the load cell and the gage factor of the strain gages. The modulus of elasticity decreases when the temperature is raised, so the strains sensed by the strain gages at constant load F increase with increasing temperature in the load cell, and the gage factor of the strain gages increase with increasing temperature. Both effects would thus cause the signal to the measuring device 51 to increase with the temperature of the load cell if the strain gage bridge were supplied with a constant voltage. The effect of the temperature dependent resistors 45', 45" is to reduce the supply voltage to the strain gage bridge when the temperature of the load cell increases, so that the signal supplied to the measuring device 51 at fixed bridge unbalance decreases with increasing temperature. By selecting the proper values and the proper temperature coefficient for resistors 45', 45", it is possible to exactly compensate for the temperature dependence of the modulus of elasticity and the gage factor, as is known in the art. Resistors 45', 45" are usually nickel or Balco resistors, often shunted by temperature independent resistors for optimization of the temperature compensation.

The four strain gages 41, 42, 43, 44 all have the same nominal resistance value, usually a standard value of 350 Ohm or 1,000 Ohm. The resistance tolerance is, however, in the order of 0.2%, so the bridge will initially not be balanced when there is no load F on the load cell. This zero signal can be cancelled either by means of a shunt resistor 65 across one of the bridge arms, or by means of a resistor 66 connecting a corner (D) of the strain gag bridge with one terminal of the power supply 50.

Either of resistors 65, 66 will compensate for an output signal from the bridge 40 at zero load on the load cell, but their effects on the bridge are quite different. The difference becomes apparent when the load cell is subjected to temperature change while mechanically unloaded. In its initial state, without resistors 65, 66, the output signal from the second bridge diagonal (C-D) will usually not be zero, and the signal will change with the temperature on the load cell. Resistor 66 adds a constant voltage counteracting the no load signal from the second bridge diagonal, so it can balance the bridge at any temperature, but the counteracting voltage does not vary with temperature. Accordingly, resistor 66 does not change the variation with temperature of the zero signal. Resistor 65, on the other hand, causes an imbalance in the strain gage bridge, so it affects the temperature dependence of the zero signal as well as the amount of zero signal.

If all the temperature dependence of the zero signal were caused by the bridge unbalance, then resistor 65 would cancel both the zero signal and the change in zero signal with temperature. In practice, however, this is not the case. The residual temperature dependence, which can be either positive or negative, is caused by small differences between individual strain gages in the temperature coefficient of the resistance and the linear expansion coefficient of the gage material, as well as by the temperature dependence of the resistance in copper wires used to interconnect the strain gages.

A known method for adjustment of both zero voltage and the temperature effect on the zero voltage in a strain gage bridge utilizes the different effects of resistors 65 and 66, by first selecting a resistor 65 that will cancel the temperature dependence of the output signal from the bridge 40, irrespective of the amount of the remaining zero signal, and then adding a resistor 66 that will cancel the remaining zero signal. The resistance values for resistors 65 and 66 can be determined by trial and error, or by calculations based on the measured zero signal at two different temperatures on the load cell and data for the strain gages and the temperature compensating resistors 45′, 45″.

In FIG. 2, the zero adjustment resistors 65 and 66 are shown connected respectively across the bridge arm with gage 43 and to the corner D of the bridge 40. However, it should be understood that resistor 65 could instead be connected across the bridge arm with gage 41, and resistor 66 could be connected to either corner C or corner D of the bridge, depending on the polarity of the corrections required to counteract the initial bridge unbalance and the polarity of the residual temperature effects on zero balance.

Figure 3:
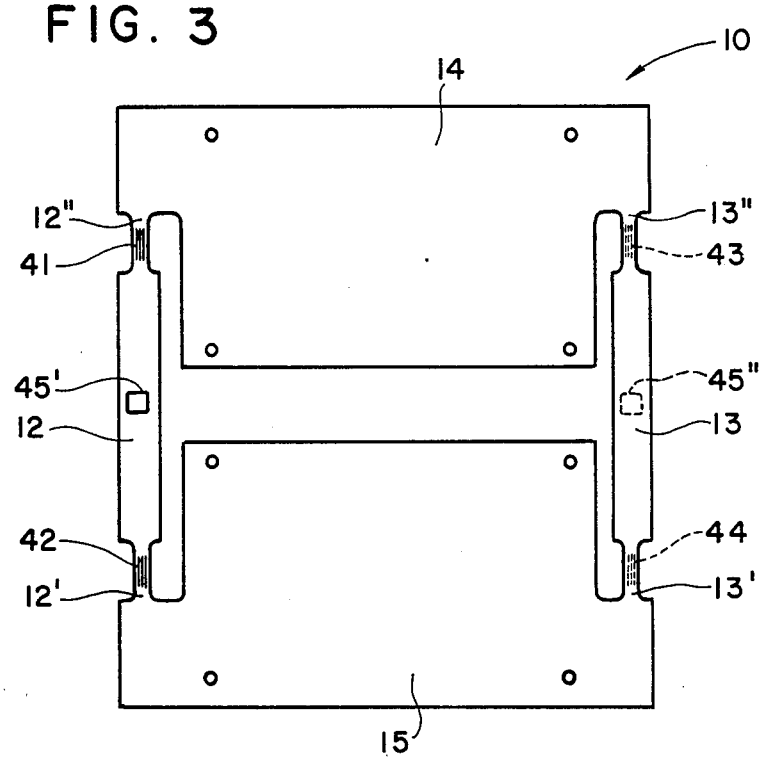
FIG. 3 is a top plan view of a load cell apparatus of the Planar Gaged Plate type as disclosed in the copending application referenced above.
Figure 4:
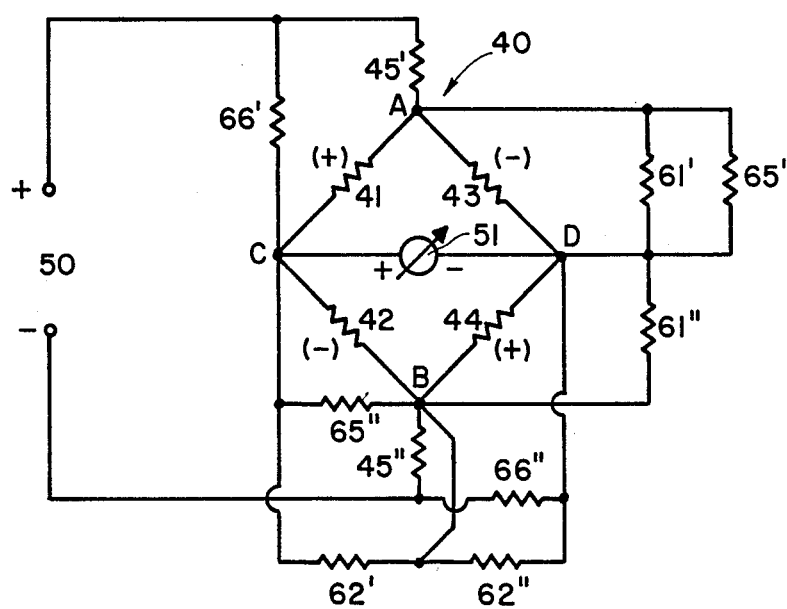
FIG. 4 is a schematic diagram of a strain gage bridge used in the load cell arrangement of FIG. 3, including sensitivity equalization resistors, and in addition zero adjustment resistors according to the invention.

FIG. 3 shows a Planar Gaged Plate load cell 10 with four individual strain gages 41, 42, 43, 44 on separate bending elements 12″, 12′ of bending member 12, and 13″ and 13′ of bending member 13. A support plate 14 is bolted to a base (not shown), and a loading surface (not shown) covering the entire load cell arrangement 10 is bolted to a receiving plate 15. When a weight, such as a letter or package, is placed on the loading surface, the strains sensed by the four strain gages 41, 42, 43, 44 will be different, and the difference varies with the location of the center of gravity on the loading surface. Commonly-assigned, and currently filed and copending application entitled "Force Measuring Device with Sensitivity Equalization" by Harry E. Lockery, and incorporated herein by reference, discloses a new apparatus and method for equalizing the sensitivities of the four strain gages 41, 42, 43, 44, so the signal from a strain gage bridge containing the four strain gages 41, 42, 43, 44 will be independent of the location of the center of gravity of the load. The strain gage bridge 40 is shown in FIG. 4.

The equalization of the corner sensitivities is achieved, according to the copending Lockery application referenced above, by shunting a bridge half containing the right bridge half (43, 44) or left bridge half (41,42) by a pair of equal resistors 61′, 61″ to eliminate any sensitivity difference between the right and the left side of the device, and by shunting the front bridge half (42, 44) or back bridge half (41, 43) by a pair of equal resistors 62′, 62″ to eliminate any front to back difference in sensitivity.

Zero adjustment is required for this load cell bridge, as always for strain gage bridges However, the known method described above with reference to FIG. 2 can not be used, because resistors 65 and 66 would act as shunts to individual strain gages (41, 43). Resistors 65 and 66 would accordingly change the sensitivity of the shunted bridge arms, so the load cell 10 would become sensitive to the location of the center of gravity of the load F. The resistance value of resistors 65 and 66 used in the zero adjustment method discussed in connection with FIG. 2 are typically 0.1 Megohm or larger for a bridge with 350 ohm strain gages, so the shunting effect on the sensitivity is small, but not negligible. In the load cell shown in FIGS. 1A, 1B and 1C this was not a problem, because all the four strain gages in this load cell sense a common shear strain, so the sensitivity of individual gages is not critical Zero adjustment of the strain gage bridge in FIG. 4 with sensitivity equalization by shunting of half bridges (43, 44 and 42, 44) by resistor pairs (61′, 61″ and 62′, 62″) can, however, be made according to the invention without upsetting the sensitivity adjustment. This is achieved by using a pair of equal resistors 65′ and 65″ shunting opposing bridge arms (42, 43) for eliminating the temperature variation of the zero signal, and a pair of equal resistors 66′ and 66″ connecting opposite corners (C-D) of the strain gage bridge 40 to opposite terminals of the power supply 50 for the strain gage bridge for cancelling the remaining zero signal, as shown in FIG. 4.

In this case, the shunting effect of resistor 65′ affects the sensitivity of both the right hand half bridge (43, 44) and the top half bridge (41, 43) by the same amount as the shunting effect of the equally large resistor 65″ affects both the left hand half bridge (41, 42) and the bottom half bridge (42, 44). Therefore, the two effects balance each other in both sets of half bridges In the same way the shunting effects of the two equal resistors 66′ and 66″ balance each other. The relative sensitivities of all the bridge arms thus remain unchanged after the zero adjustment.

The shunting effect of the zero adjustment resistors 65′, 65″, 66′, 66″ will cause a slight reduction in the overall sensitivity of the load cell 10, as will the shunting effect of the sensitivity equalization resistors 61′, 61″, 62′, 62″. However, this is corrected in the final calibration of the measuring circuit 51, as usual in the art.

The determination of resistance values for the zero compensating resistors 65′, 65″ and 66′, 66″ can be made as explained below, based on data for the strain gages 41, 42, 43, 44 and the temperature compensating resistors 45', 45" and the measured zero signal at two different temperatures on the load cell. We will use the following designations:

$R45_T$ = Resistance in each of resistors 45' and 45" at temperature T.

R65', R65", R66', R66" for resistances in resistors 65', 65", 66' and 66" respectively.

$RB_{AB}$ and $RB_{CD}$ for resistances measured over bridge diagonals A-B and C-D respectively.

RG = Nominal resistance of each individual bridge arm.

US = Supply voltage (50).

$UB_T$ = Voltage over bridge diagonal A-B at temperature T.

$UOCD_T$ = Voltage between bridge corners C and D at open circuit at temperature T.

$ISCD_T$ = Current in short circuit between bridge corners C - D at temperature T.

For the example calculations the following data is assumed:

a. RG = 350 ohm. Material Constantan, temperature coefficient 0.00001/° C.
b. Temperature compensating resistors 45' and 45" each are 30 ohm nickel resistor in parallel with 300 ohm metal film resistor for load cell material aluminum alloy 2024-T3. Temperature coefficient for Nickel = 0.006/° C.
c. US = 10V
d. $UOCD_{20} = 4.00$ mV and $UOCD_{50} = 3.910$ mV. Temperatures 20° C. and 50° C. were selected arbitrarily.

The temperature coefficients for the strain gages and the metal film resistors are so small compared to the temperature coefficient for the nickel resistors that they can be set to zero in the following calculations without significant errors.

From the data above, the following formulas are obtained by using elementary circuit theory:

$$R45_T = 300*30*(1 + 0.006*(T - 20° C.))/(300 + 30*(1 + 0.006*(T - 20° C.)) \quad (I)$$

Which gives: $R45_{20} = 27.2727$ ohm and $R45_{50} = 31.6637$ ohm (II) $UB_T = US*RB_{AB}/(RB_{AB}+2*R45_T)$ The actual value for $RB_{AB}$ can be measured, but for practical purposes, one can use its nominal value: $RB_{AB}$ = RG = 350 ohm. When we insert the known values in formula (II), the following values are obtained:

$UB_{20} = 8.652$ V and $UB_{50} = 8.468$ V

If the temperature variation of the zero signal were caused only by the temperature compensating resistors 45' and 45", then the zero signal would at 50° C. be reduced to:

$$UOCD_{50}' = UOCD_{20} * UB_{50}/UB_{20} \quad (III)$$

Which gives: $UOCD_{50}' = 4.00$ mV * 8.468/8.652 = 3.915 mV.

The measured zero signal at 50° C. was $UOCD_{50} = 3.910$ mV, so there is a residual temperature dependence that increases the temperature change of the zero signal from a theoretical value of 0.085 mV to the actual value 0.090 mV for 30° C. temperature variation. Resistors 65' and 65" must accordingly be calculated to compensate for a zero signal that is larger than the measured signal at 20° C.:

$$UOCD_{20}' = UOCD_{20}*(UOCD_{20} - UOCD_{50})/(UOCD_{20} - UOCD_{50}') \quad (IV)$$

When the measured and previously calculated values are inserted, $UOCD_{20} = 4.00$ mV; $UOCD_{50} = 3.910$ mV; $UOCD_{50}' = 3.915$, the following value is obtained:
$UOCD_{20}' = 4.235$ mV If circuit bridge terminals C-D are shorted before any of resistors 65', 65", 66' and 66" are connected, but with equalization resistors 61', 61", 62" and 62" in place, the unbalance voltage $UOCD_{20}'$ would give rise to a short circuit current $ISCD_{20}'$:

$$ISCD_{20}' = UOCD_{20}'/RB_{CD} \quad (V)$$

Current flow is positive from C to D.

When two equal resistors R65, and R65" are added as shown in FIG. 4. they will add a short circuit current $ISCD_{20}''$:

$$ISCD_{20}'' = -UB_{20}/(R65'+R65'') \quad (VI)$$

The minus sign means that current flows from D to C.

The bridge will be balanced when the net short circuit current is zero, which is the same as $ISCD_{20}'+ISCD_{20}'' = 0$, or:

$$UOCD_{20}'/RB_{CD} = UB_{20}/(R65'+R65'') \quad (VII)$$

$RB_{CD}$ can be measured for maximum accuracy, but it is usually sufficient to use its nominal value, which is $RB_{CD}$ = RG = 350 ohm. $UOCD_{20}''=4.235$ mV, $UB_{20}=8.652$ V and R65'=R65". When these data are inserted in formula (VII), the following values are obtained:

R65' = R65" = 357.5 kohm

After resistors 65' and 65" are connected, there remains a bridge unbalance caused by the difference between the theoretical zero voltage $U0CD_{20}'$, which is compensated by R65' and R65", and the actual zero voltage $UOCD_{20}$. This unbalance gives rise to a short circuit current $ISCD_{20}''$, which will have the value:

$$ISCD_{20}'' = (UOCD_{20}-UOCD_{20}')/RB_{CD} \quad (VIII)$$

When two equal resistors R66' and R66" are added as shown in FIG. 4, they will add a short circuit current $ISCD_{20}'''$:

$$ISCD_{20}''' = US/(R66'+R66'') \quad (IX)$$

The bridge will be balanced when the net short circuit current is zero, which is the same as $ISCD_{20}'+ISCD_{20}''' = 0$, or:

$$-(UOCD_{20}-UOCD_{20}')/RB_{CD}=US/(R66'+R66'') \quad (X)$$

$RB_{CD}$ can be measured for maximum accuracy, but it is usually sufficient to use its nominal value, which is $RB_{CD}$ = RG = 350 ohm. $UOCD_{20}=4.000$ mV, $UOCD_{20}'=4.235$ mV, US = 10 V and R66'=R66".

When these data are inserted in formula (X), the following values are obtained:

$$R66' = R66'' = 7.447 \text{ Mohm}$$

The calculations outlined above can easily be written as a computer program so the values for resistors 65', 65" and 66', 66" can be calculated automatically after the two zero readings at different temperature have been made, and the bridge diagonal resistance $RB_{CD}$ has been measured for maximum accuracy, if desired.

It should be noted, that the actual resistors 65', 65" and 66', 66" will normally be picked from a series of standard resistors, such as a R96 series, and that the individual resistance values deviate from a nominal value by a certain tolerance. The resistors in a pair actually used in the circuit will accordingly not have exactly equal resistance values, nor will the resistance values be exactly equal to the calculated values, but the errors are usually negligible. It will be noted from formulas (VII) and (X), that it is actually the sum of the resistances in each pair that determine the accuracy of the bridge balance. Therefore, it is possible to improve the accuracy of the compensation by selecting the two resistors in a pair from adjacent R96 values instead of from the same R96 value. Such a small deviation will not affect the sensitivity equalization of the individual strain gage elements to any significant degree.

It should be clear from the explanations above, that the locations of resistors 65' and 65" shown in FIG. 4 are valid for the specific data assumed in the example above, and that they may be across bridge arms 41 and 44 in other cases. It should also be clear that resistors 66' and 66" should be connected respectively to bridge corners C and D under the conditions assumed in the example above, but they may have to be connected to the opposite bridge corners (D and C respectively) if the conditions are different.

The condition defined as no load on the load cell 10 may include the case of a constant tare load acting on the load cell. The zero adjustment works equally well in such a case, provided only that the tare load is always present during all tests, especially during the tests with different temperatures on the load cell.

The invention is not limited to the type of load cell used as examples herein. It can be used for zero balancing in all kinds of 25 strain gage load cells, including such that do not require equal sensitivity in individual gages. However, the invention's advantages are most apparent in sensitivity equalized load cell arrangements.

What I claim is:

1. A load cell apparatus with a strain gage bridge having four strain gage means, a power supply for said strain gage bridge, a pair of temperature compensation resistors connected between each end of a first diagonal of said strain gage bridge and said power supply, and a second diagonal in said strain gage bridge providing an output signal, the apparatus comprising:
    (a) a first pair of substantially equal resistors connected across one pair of opposing arms of the strain gage bridge so that the signal at zero load on the load cell apparatus is rendered independent of temperature; and
    (b) a second pair of substantially equal resistors connected between opposite ends of the second bridge diagonal and opposite terminals of the power supply so the signal at zero load on the load cell apparatus is cancelled.

2. A strain gage bridge circuit comprising:
    (a) four strain gage means connected together for forming a strain gage bridge;
    (b) a pair of temperature compensation resistors;
    (c) a supply circuit connected to a first diagonal of said strain gage bridge in series with said pair of temperature compensation resistors, a second diagonal of said strain gage bridge providing an output signal;
    (d) a first pair of substantially equal resistors connected across a pair of opposite arms in said strain gage bridge; and
    (e) a second pair of substantially equal resistors connected between opposite terminals of said power supply and opposite ends of said second diagonal of said strain gage bridge.

3. A method for zero adjustment of a strain gage bridge in a load cell arrangement having four strain gage means and a pair of temperature compensation resistors connected between each end of a first, diagonal in said bridge and a power supply for said bridge, a second diagonal of said strain gage bridge providing an output signal, the method comprising the steps of:
    (a) measuring the output signal at zero mechanical load on said load cell arrangement at two different ambient temperatures,
    (b) determining a value for a first pair of substantially equal resistors to be connected as shunts across a pair of opposing arms of the strain gage bridge to make the temperature variation of the signal at zero load independent of temperature, and connecting such a first pair of resistors in the circuit;
    (c) determining a value for a second pair of substantially equal resistors to be connected between opposite terminals of the power supply and opposite ends of the second diagonal of the strain gage bridge to make the output signal zero when there is no mechanical load on the load cell, and connecting the second pair of resistors in the circuit.

* * * * *